Patented Aug. 2, 1938

2,125,383

UNITED STATES PATENT OFFICE 2,125,383

PURIFICATION OF LACTIC ACID

Alexander Douglas Macallum, Niagara Falls, N. Y., assignor to E. I. du Pont de Nemours & Company, Wilmington, Del., a corporation of Delaware No Drawing. Application February 11, 1935, Serial No. 6,095

3 Claims. (Cl. 260—122)

This invention relates to the purification of lactic acid, and more particularly to a new and advantageous method of distilling lactic acid solutions.

The present application is a continuation in part of my co-pending application Serial Number 654,250 now U. S. Patent 2,013,104, issued September 3, 1935 on "Purification of lactic acid."

The purification of lactic acid by distillation is difficult because of its tendency to decompose at elevated temperatures. Heretofore, a number of methods for purifying lactic acid solutions by distillation have been proposed. Such proposed methods have included distillation in vacuo, distillation at atmospheric pressure in the presence of superheated steam at elevated temperatures, e. g., 230° to 240° C., and passing dry air through an aqueous solution at lower temperatures, e. g., 120° to 130° C., and recovering a purified lactic acid solution by condensing the offgases. These proposed processes have not met with success in commercial practice because they do not entirely avoid decomposition of the lactic acid and are not capable of producing the purified product in high yields. For example, ordinary vacuum distillation and other low temperature distillation methods heretofore proposed, while reducing thermal decomposition, result in the formation of considerable amounts of lactic anhydride and polymers of lactic acid. Also, steam distillation of lactic acid solutions as heretofore practiced fails to produce a pure product, the distillate often being colored.

An object of this invention is to provide a method for purifying lactic acid capable of producing a U. S. P. grade of acid in high yields. A further object is to provide a new means for distilling lactic acid solutions, which is more efficient than methods previously proposed. Other objects will be apparent hereinafter.

I have found that impure aqueous solutions of lactic acid may be purified with a very small decomposition loss by steam distillation at pressures below one atmosphere. This process results in high yields of purified solutions which require little or no further treatment to meet the U. S. Pharmacopoeia requirements for purity.

The present invention is based on my discovery that anhydride and polymer formation, occurring in ordinary vacuum distillation of lactic acid solutions, may be prevented by passing a stream of steam or water vapor into contact with the solution being vacuum-distilled. Due to the low temperatures employed, thermal decomposition is reduced to a minimum; the net result is the production of an acid of high purity in excellent yield.

In one method of carrying out my invention, steam or water vapor having a temperature of between 50° and 120° C. is passed through a body of lactic acid in aqueous solution, which may be heated if necessary, so that the temperature of the vapors leaving the still is at 70° to 115° C., the whole operation being carried out under an absolute pressure of preferably around 10 to 25 millimeters of mercury. Preferably, the vapors leaving the still are passed successively through two condensers, the first of which is cooled to a temperature of around 40° to 50° C., and the second of which is cooled to the neighborhood of 0° C. The product obtained from the first condenser consists of a pure solution containing from 60–90% by weight of lactic acid; the product from the second condenser is a pure but rather dilute lactic acid solution. The product from the first condenser is colorless and of a high purity, but in some cases has a slight, disagreeable odor. I have discovered that this odor may be entirely removed by one of several methods. One method comprises passing a current of steam, preferably at around 100° C., through the solution for a suitable period of time, e. g., a few minutes, and thereafter treating the solution with charcoal, and filtering. Preferably, I use finely divided, activated charcoal and contact it with the solution for 15 to 20 minutes before filtering. Another method for removing the odor comprises adding a small amount of hydrogen peroxide, e. g., around 1% by weight of 30% $H_2O_2$ solution, to the lactic acid solution.

The purified solution may be concentrated if necessary by vacuum evaporation to 85 to 90% by weight of lactic acid.

My invention may be further illustrated by the following example.

Example

A quantity of an impure lactic acid solution made by a fermentation process and containing about 44% by weight of lactic acid, was placed in a distilling vessel heated in an oil bath. The still was connected to two condensers in series and thence to a vacuum pump. The temperature in the first condenser was maintained at about 40° C. and the temperature in the second condenser at about 0° C. Steam, having a temperature of between 75° and 80° C., was passed through the solution in the still; the vapors leaving the still had a temperature of about 80° C. The pressure in the distilling flask was maintained at 18-23 mm. of mercury; at a point between the second condenser and the pump the pressure varied between 9 and 10 mm. of mercury. Analysis of the solution obtained from the first condenser showed that 86.2% of the acid in the original solution was recovered in this condensate, the condensate containing 86% by weight of lactic acid. This product met all the requirements of the U. S. Pharmacopoeia except that it contained a trace of sugars.

The above description of my invention is given merely by way of example, and it is obvious that the process may be varied considerably without departing from the spirit and scope of my invention. For instance, the temperature and pressure of the distillation may be varied considerably with favorable results. However, I prefer to maintain a temperature of distillation not greater than 120° C. and to maintain the pressure below 50 millimeters of mercury, absolute pressure. If desired, a single condenser may be used in place of the fractional condensing system described above, or a fractionating column may be employed. As illustrated by the example, it is possible to obtain a highly concentrated solution by use of a fractional condensation.

My process is well adapted for continuous operation, for instance by simultaneously flowing steam and lactic acid solution into a heated or insulated still and condensing the issuing vapors fractionally or otherwise. The process may be operated by the so-called flash distillation method, in which no appreciable amount of liquid is allowed to accumulate in the still. For such flash distillation, it is preferable to use a still having a long, slightly sloping bottom, down which the solution is allowed to flow. If this type of still is used, the steam may enter either with the lactic acid solution or counter-current thereto.

My process is suitable for purifying lactic acid obtained from the hydrolysis of lacto-nitrile as well as the fermentation product mentioned in the above example.

I claim:

1. A process for refining a crude lactic acid solution selected from the group consisting of lactic acid solutions made by fermentation and those prepared by hydrolysis of lacto-nitrile comprising steam distilling said solution and adding to the condensate a small amount of hydrogen peroxide.

2. A process for refining a crude lactic acid solution selected from the group consisting of lactic acid solutions made by fermentation and those prepared by hydrolysis of lacto-nitrile comprising distilling said solution under a pressure of less than one atmosphere while concurrently passing a stream of water vapor into contact with said solution, condensing the distilled vapors and adding a small amount of hydrogen peroxide to the condensate.

3. A process for refining a crude lactic acid solution selected from the group consisting of lactic acid solutions made by fermentation and those prepared by hydrolysis of lacto-nitrile comprising steam distilling said solution under a pressure of 10 to 25 mm. of mercury at a temperature of about 80° C. and adding to the condensate hydrogen peroxide equivalent to about 1% by weight of a 30% hydrogen peroxide solution.

ALEXANDER DOUGLAS MACALLUM.